July 29, 1947.    E. A. WENK    2,424,727
ADAPTER FOR FLARED TUBE FITTINGS
Filed April 21, 1944

INVENTOR.
Edward A. Wenk
BY
Popov and Popov
Attorneys

Patented July 29, 1947

2,424,727

UNITED STATES PATENT OFFICE 2,424,727

ADAPTER FOR FLARED TUBE FITTINGS

Edward A. Wenk, New York, N. Y., assignor to The Keystone Manufacturing Co., Buffalo, N. Y., a corporation of New York Application April 21, 1944, Serial No. 532,133

2 Claims. (Cl. 285—86)

This invention relates to adapters for flared tube fittings and more particularly to such adapters which permit a standard fitting to be connected with flared tubing of smaller diameter than the size for which it is designed.

Standard flared tube fittings, such as L's, T's, unions, crosses and the like, as now manufactured, are designed to be connected with the flared ends of standard tubing of a certain diameter. Thus a ¾ inch fitting can be applied to ¾ inch tubing but cannot be applied to tubing of a different diameter. Where it is necessary to connect one size of tubing with another size of tubing it is necessary to provide a fitting specially designed for this purpose. For example if a T is to be used in conjunction with ¾ and ½ inch tubing, its legs must be differently designed to accommodate tubing of these particular different diameters. As a result, to meet all demands, the dealer in flared tube fittings is required to stock a vast assortment of fittings to meet all requirements and all permutations of tube sizes which a fitting may be required to connect. Further special fittings, that is, fittings designed to accommodate tubing of different diameters, are more costly, this being due to the fact that such special fittings are less in demand and hence not subject to the savings of mass production to the same degree as standard fittings and also due to the expense incident to inventory of and error in supplying such special fittings.

It is the principal object of the present invention to provide a low cost adapter whereby any leg of any standard flared tube fitting can be adapted to connect with a tube of smaller diameter than that for which it is designed. By this means the dealer in fittings need only stock standard fittings and if a call is received for a special fitting he can supply a standard fitting with an appropriate adapter. By this means he is enabled to reduce his stock of fittings to a fraction of that now required and also meet any special demand which is made. Further the repairman need only carry a supply of standard fittings and adapters to meet any situation which he encounters on the job.

Another object is to provide such an adapter which permits the use of defective fittings, particularly those having damaged flare faces on smaller sizes of tubing.

Another object is to provide such an adapter which prevents injury to the soft tubing, one member of the adapter being interposed between the nut of the fitting and the flare of the tubing so as to protect the flare of the tubing from being damaged by the turning nut compressing the flare.

Another object is to provide such adapters which are low in cost thereby to reduce the total cost of flared tubing installations which involves the use of tubing of different sizes.

Another object is to provide such fittings which are simple and can readily be used without danger of error.

Another object is to provide such adapters which, when used, provide a joint which is as strong and as leakproof as the joints heretofore provided by the use of special fittings.

Other objects are to provide such adapters which are not subject to deterioration and which will stand up under conditions of severe and constant use without leaking or requiring replacement.

Figure 1:
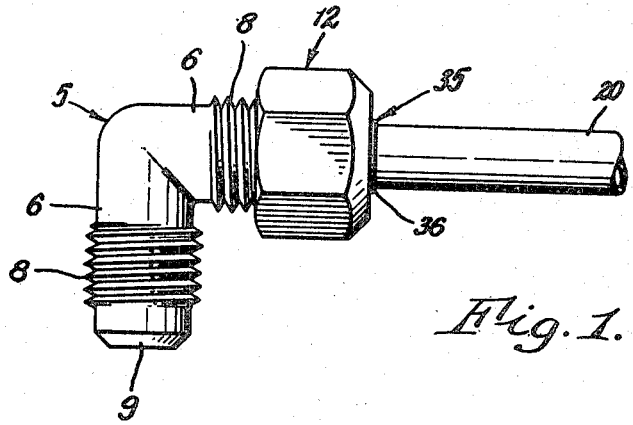
Fig. 1 is a side elevation of a standard flared tube fitting in the form of an L, one leg of this fitting being connected with a smaller diameter tube by a pair of adapters embodying the present invention.
Figure 2:
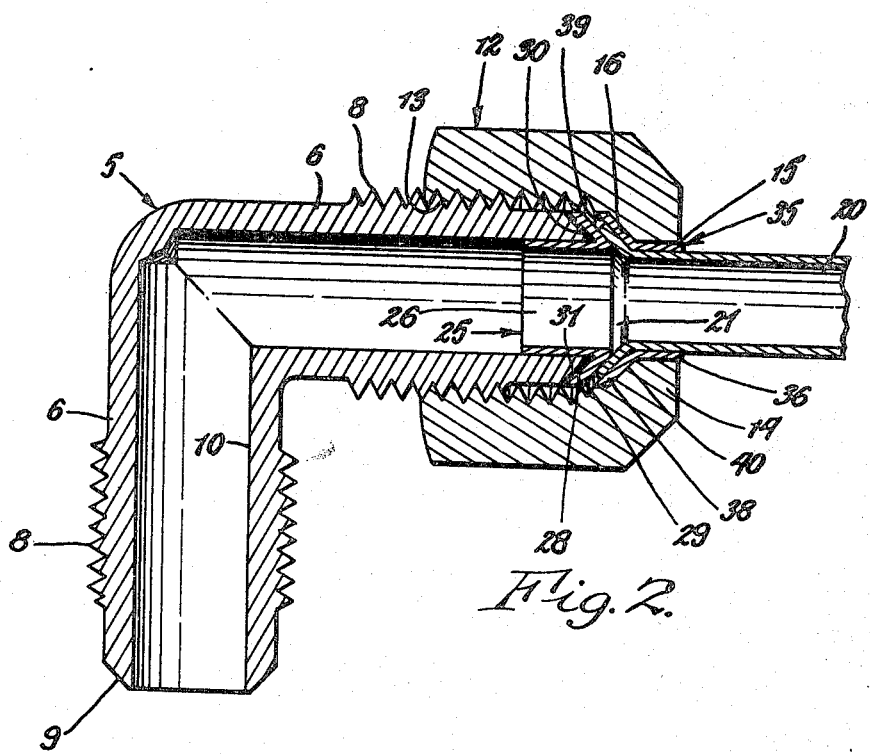
Fig. 2 is an enlarged central section through the fitting, adapters and tube shown in Fig. 1.

The invention is shown as used in conjunction with a standard fitting for flared tubing, the body of this fitting being shown as being in the form of an L 5. However, it will be understood that the invention is equally applicable to T's, crosses, unions or any of the various other types of standard flared tube fittings. The L 5 is shown as being a standard L adapted to be connected at its opposite ends to the flared ends of, say, two lengths of ¾ inch diameter tubing. For this purpose the two legs 6 of the L are identical each being externally threaded, as indicated at 8, and the end of each being of beveled or conical form, as indicated at 9, around the L-shaped bore 10 which extends through the L. Each conical taper or bevel 9 is of convex form and normally would fit into the flared end of a ¾ inch tube (not shown). The fitting is provided with a pair of standard nuts or female parts 12 only one of which is shown. Each nut 12 is of hexagonal or other out-of-round form on its exterior to permit of the convenient application of a wrench thereto and is provided with a bore 13 which is threaded to fit on the threads 8 of the body of the fitting. This threaded bore 13 leads to an end wall 14 which is in turn provided with a smaller bore 15 of the size required to fit tubing of the assumed diameter of ¾ inch. The end face 16 between the bores 13 and 15 is of concave tapering or conical form complementary to the convex conical face 9 at each end of the body 5 of the fitting.

In normal use the end of the assumed ¾ inch tube (not shown) to be connected is flared to conform to the angle of the conical or tapered faces 9 and 16 of the fitting in the usual and well known manner. The nut 12 is fitted on this tube with the tube extending through its small bore 15 either before or after the tube is so flared and the nut is then screwed tightly on one leg 6 of the fitting. This brings the flare of the tubing into engagement with the conical or tapered faces 9 and 16 of the leg and nut, respectively, and tightly compresses the flare between these faces so as to provide a leak-tight joint capable of withstanding high pressures.

The adapter forming the subject of the present invention is to permit of connecting a tube 20 of smaller diameter, say ½ inch, to one or both legs 6 of the assumed ¾ inch fitting, using the same nuts 12. This smaller tube 20 is provided with the usual bell-shaped flare 21 at the end to be connected, this flare corresponding to the form of the complementary faces 9 and 16 of the body and nuts of the fitting. However, it is not practicable to provide such a flare in a smaller tube as would be reliably held between these faces 9 and 16 of an oversized fitting and still provide a strong and leak-proof joint. This is because providing such an oversized flare on an undersize tube would crack the metal at the flare and result in leakage.

The adapter forming the subject of the present invention is in two male and female parts. The male part 25 is in the form of a tubular mushroom shaped body having a tubular stem or sleeve 26 of an external diameter adapted to fit into the bore 10 of the body 5 of the fitting and having an outwardly projecting head or flange 28 at one end. This head or flange 28 is laid back at the same angle as the faces 9 and 16 of the body and nut of the fitting thereby to provide a conical or beveled end face 29 which is convex and adapted to engage the inner face of the expanded flare 21 of the tube and also to provide a conical or beveled concave underface 30 which is adapted to oppose the conical face 9 of the body of the fitting. An annular bead 31 is preferably provided to project outwardly from the face 30 to insure a leak-proof joint between the adapter member 25 and the body 5 of the fitting.

The female part 35 of the adapter is in the form of a tubular mushroom shaped body having a tubular stem or sleeve 36 of an external diameter adapted to fit into the small bore 15 of the nut 12 and having an outwardly projecting bell-shaped head or flange 38 at one end. This head or flange 38 extends forwardly and outwardly so as to provide an inner concave beveled or conical face 39 and an outer convex beveled or conical face 40, these faces 39 and 40 being arranged at the same angle as the conical faces 9 and 16 of the body and nut of the fitting and the faces 29 and 30 of the male adapter member 25.

When it is desired to fit a, say, ¾ inch body 5 and nut 12 to the end of, say, the ½ inch tube 20, the nut 12 and the female adapter member 35 are first fitted over the undersized tube 20 with the stem 36 of the adapter member 35 fitted in the small bore 15 of the nut and with the convex conical face 40 of the adapter member in engagement with the concave conical face 16 of the nut. The end of the tube 20 is then flared, the flare 21 being at the same angle as the faces 9 and 16 of the fitting members and as the opposite faces of the flanges of the adapter members. The stem 26 of the male adapter member 25 is then fitted in the bore 10 of the body 5 with its flange 28 against the corresponding conical face 9 of the fitting.

The nut 12 is then fitted to the threads 8 of the body 5, and tightened down. Tightening this nut forces its conical face 16 into firm engagement with the conical face 40 of the female adapter member 35. Likewise this tightening forces the conical face 39 of this adapter member into firm engagement with the outer conical face of the flare 21 of the tube 20. Likewise the inner conical face of this flare 21 is forced into firm engagement with the outer conical face 29 of the male adapter member 25 and the bead 31 of this male adapter member is forced into firm engagement with the corresponding conical face 9 of the body 5 of the fitting. It will therefore be seen that a tight joint is provided by the adapter members 25 and 35 between the oversized standard fitting and the undersized tube and that this joint will withstand the high pressures which flared tubing is particularly designed to handle.

It will be seen that the adapter forming the subject of the invention permits the use of defective fittings with tubing of smaller diameter than that for which the defective fitting is designed. Thus, suppose the flare face 9 or 16 of the body or nut is injured, it will be seen that the adapter members will make firm contact with these faces and provide an uninjured flare face for the flare 21 of the tube. Further, it will be seen that the adapter member 35 protects the flare of the tube from injury. Thus in normal application, without the adapters, the nut 12 on being screwed down turns after it has been brought into compressive relation with the flare 21, this turning tending to tear the flare. By interposing the adapter member 35 between the flare and the nut, the turning contact is between the nut and the adapter member and a pure compressive force is impressed on the flare.

By stocking various sizes of adapters it will be seen that the dealer and repairman can adapt any size or type of flared tube fitting to any smaller size of tubing, thereby eliminating the necessity for stocking the necessarily large number and very costly fittings, such as L's, having one end formed to receive one size of tubing and its other end to receive another size of tubing. It will further be seen that the adapters are very low in cost and can easily be incorporated in the joint without danger of error and will provide a joint which is equally effective in preventing leakage at high pressures as standard flared tube fitting joints.

I claim as my invention:

1. An adapter between a thin walled tube having an end flare and an oversized fitting including a body having a bore and an annular face at one end surrounding said bore and a nut secured to said one end of said body and having a bore coaxial with and equal in diameter to said first bore and having an annular face opposing said first annular face; comprising a sleeve fitted in said bore of said body and having an annular flange engaging said annular face of said body, and a second sleeve fitted in said bore of said nut and of the same radial size as said first sleeve and having an annular flange engaging said annular face of said nut, said tube fitting in said second sleeve and having its flare held between said flanges.

2. An adapter between a thin walled tube having a conical end flare and an oversized fitting including a body having a bore and a convex conical face at one end surrounding said bore and a nut secured to said one end of said body and having a bore coaxial with and equal in diameter to said first bore and having a concave conical face opposing said first conical face; comprising a sleeve fitted in said bore of said body and having a conical flange fitting said convex face of said body, and a second sleeve fitted in said bore of said nut and of the same radial size as said first sleeve and having a conical flange fitting said concave face of said nut, said tube fitting in said second sleeve and having its flare fitted between said flanges.

EDWARD A. WENK.

REFERENCES CITED

The following references are of record in the file of this patent:

UNITED STATES PATENTS

| Number | Name | Date |
| --- | --- | --- |
| 2,354,460 | Hillis | July 25, 1944 |
| 1,133,320 | Rockwood | Mar. 30, 1915 |